(12) United States Patent
Viadella et al.

(10) Patent No.: US 6,385,315 B1
(45) Date of Patent: May 7, 2002

(54) VIDEO VOICE SEPARATION SYSTEM

(75) Inventors: James Viadella, Huntington; Fred Traut, Milford, both of CT (US)

(73) Assignee: MPhase Corporation, Norwalk, CT (US)

( * ) Notice: Subject to any disclaimer, the term of this patent is extended or adjusted under 35 U.S.C. 154(b) by 0 days.

(21) Appl. No.: 09/326,131

(22) Filed: Jun. 4, 1999

Related U.S. Application Data (60) Provisional application No. 60/088,172, filed on Jun. 5, 1998, provisional application No. 60/088,173, filed on Jun. 5, 1998, and provisional application No. 60/088,260, filed on Jun. 5, 1998.

(51) Int. Cl.[7] .............................. H04M 1/00; H04M 3/00
(52) U.S. Cl. ........................ 379/399; 379/327; 379/332
(58) Field of Search .............. 324/117 R; 330/165–167, 330/188–189, 195–196; 348/12–15; 375/220, 258; 379/93.01, 93.05, 93.07, 93.14, 319–320, 349, 357, 391, 395, 397–399, 136; 455/402, 341; 336/118; 307/106, 108; 333/126, 184–186; 439/620, 622, 188

(56) References Cited

U.S. PATENT DOCUMENTS

| | | | | |
|---|---|---|---|---|
| 3,708,697 A | * | 1/1973 | Georgopoulos | 307/106 |
| 3,778,720 A | * | 12/1973 | Yello | 455/341 |
| 3,917,908 A | * | 11/1975 | Galluccio | 379/136 |
| 4,931,754 A | * | 6/1990 | Moussie | 333/184 |
| 5,341,280 A | * | 8/1994 | Divan et al. | 336/118 |
| 5,469,495 A | * | 11/1995 | Beveridge | 348/14 |
| 5,517,104 A | * | 5/1996 | Kawakami | 324/117 R |
| 5,528,630 A | * | 6/1996 | Ashley et al. | 375/258 |
| 5,603,640 A | * | 2/1997 | Mouissie | 439/620 |
| 5,627,501 A | * | 5/1997 | Biran et al. | 333/126 |
| 5,692,043 A | * | 11/1997 | Gliga et al. | 379/399 |
| 5,729,824 A | * | 3/1998 | O'Neil et al. | 348/14 |
| 5,889,856 A | * | 3/1999 | O'Toole et al. | 379/399 |
| 6,132,229 A | * | 10/2000 | Wu | 439/188 |

\* cited by examiner

*Primary Examiner*—Curtis Kuntz
*Assistant Examiner*—George Eng
(74) *Attorney, Agent, or Firm*—Perman & Green, LLP (57) ABSTRACT

An arrangement of plural filter circuits on a single card, and interconnection and mouthing of numerous cards on a single rack to facilitate maintenance, is provided for use in a telco. In each of the filter circuits, there is a first plurality of inductors connected in series in a first leg of a balanced line configuration of filter, a second plurality of inductors connected in series in a second leg of the balanced line configuration of filter, and a plurality of capacitors connected as cross branches between terminals of the inductors. A substrate supports the capacitors and the inductors, wherein each of the inductors is a toroidally wound inductor comprising a toroidal core of magnetic saturation inhibiting material. The saturation inhibiting core material allows reduction in size of a cross-sectional dimension of the core to approximately the cross-sectional dimension of one of the capacitors. For telco equipment, a set of connectors is mounted in a back plane of an enclosure for receiving the cards, and a plurality of bypass switches are disposed in the set of connectors for bypassing voice signals around corresponding ones of the cards. The bypass switches are placed in a state of conduction upon removal of a corresponding one of the cards from the set of connectors.

20 Claims, 10 Drawing Sheets

VIDEO VOICE SEPARATION SYSTEM

RELATED APPLICATIONS

This application is based on and claims right of priority in three provisional patent applications having Ser. No. 60/088,172 filed Jun. 5, 1998, Ser. No. 60/088,173 filed Jun. 5, 1998, and Ser. No. 60/088,260 filed Jun. 5, 1998, the contents of which are incorporates herein in their entirety.

BACKGROUND OF THE INVENTION

This invention relates to telephone communication equipment and, more particularly, to a compact configuration of circuitry employed in separation of video/data signals and voice signals in the central office of a telephone company (telco) and at the customer premises.

Telephonic communication among homes, businesses, and other facilities is accomplished in well-known fashion via one or more central offices of a telephone company with the electrical signals being communicated via pairs (twisted pairs) of electrically conducting wires. Voice signals are transmitted in a frequency band of a few kilohertz (kHz), typically 0–4 kdz, Wherein the twisted wire pair can carry signals ranging from DC (direct current) to the high frequency cutoff of the transmission circuitry. For normal voice signal transmission the high frequency cutoff is in the range of approximately 3–4 kHz. However the twisted wire pair is capable of transmission of electrical signals of higher frequency suitable for computer modem digital communication, and for compressed video signals such as video signals transmitted in the MPEG-2 format. Unlike transmission of such signals by coaxial cable and by satellites wherein the signals are modulated onto carriers, in the transmission of the signals via the twisted wire pair there is no use of a carrier and the signals are transmitted in their baseband format. As a result, there is considerable interest in the use of telephone lines of the telephone company (telco) for communication of high speed modem signals and compressed video signals in addition to voice signals among the homes, businesses, and other facilities who are the telephone subscribers.

In the communication, via the telephone lines, of the combined signals of voice plus video, or other higher frequency signals such as the high speed data transmitted by modem signals, the fidelity of the voice signal is enhanced by separating the voice signal from the high frequency signals. The high frequency of signals which carry video and/or data may be referred to hereinafter as the video signals for convenience of description. Voice circuitry, such as transmitter and receiver, is employed for handling the voice communication, and RADSL (rate adaptive digital subscriber line) circuitry is employed for handling the video and the data. At the telco and at the subscriber, the voice and the video are handled separately by the voice and RADSL circuits, while between telco and the subscriber, both voice and video are communicated by a common twisted pair.

In the telco, maintenance of the numerous racks of cards presents a problem in that there is a need for bypassing the voice channels of cards which are being extracted for service so as to enable a continuation of service even during the absence of the card. While such bypassing can be accomplished by a manual switching of circuitry, a manual procedure represents an inconvenience and introduces complications to the maintenance process. Furthermore, it is desirable to construct the circuits with a configuration amenable to a compact packaging of the filters of numerous circuits upon a single card, thereby reducing the storage space and increasing accessibility of the circuitry to maintenance personnel.

SUMMARY OF THE INVENTION

The aforementioned problems are overcome and other advantages are provided, in accordance with the invention, by a construction individual ones of filter circuits, an arrangement of plural filter circuit on a single card, and interconnection and mounting of numerous cards on a single rack to facilitate maintenance.

In a communication system employing the invention, a low pass filter is employed at the telco for each telephone communication channel, and another low pass filter is employed at the subscribe terminal. In each case the low pass filter serves for separation of the video from the voice. Each of the filters employs a common form of construction of inductors and capacitors, arranged in a balanced line configuration (inductors in both legs of the ladder with capacitive cross branches), wherein, in accordance with a feature of the invention, each of the inductors is provided with a toroidal core. Thereby, the inductor provides a desired amount of inductance while presenting a lower insertion loss to the circuit. The lower insertion loss, in turn, allows for increased distance between subscriber and telco. In accordance with a further feature of the invention, the size and material composition of the toroidal core of an individual one of the inductors are selected to prevent the inductor from being driven into saturation. In the construction of the low pass filter, plural inductors are located in a common plane, such as on a printed circuit board, with axes of the toroids being parallel. This inhibits magnetic coupling between the inductors. Capacitors of the filter are located alongside the inductors to facilitate manufacture and packaging.

At the telco, eight filters for eight subscriber channels are constructed on a single Eurocard, which may be referred to hereinafter as a card for convenience. Fifteen cards are mounted on a rack and connect via a set of connectors through a back plane of a cabinet to circuitry of the central office and the subscribers. Surge protection for each communication channel is provided by a sidactor, also located on the card. On each card, a common mode choke, generally employed in telephone circuits, is connected between the surge protector and its corresponding filter. During normal operation, all communications between the central office switching equipment and an individual subscriber pass through a respective filter located on one of the cards.

In accordance with the invention, a switching connector is also provided on the back plane for each of the cards. The switching connector comprises a set of spring tangs, each of which serves as a bypass in a respective one of the telephone communication channels for communication of voice, but not video, between the subscriber and the central office switching equipment upon removal of the card for service. The system of switching connectors permits servicing of individual cards without requiring removal of an entire shelf or rack of cards.

In each of the low pass filters, inductors of differing values and capacitors of differing values are to provide the desired filter characteristics. In the case of cards mounted in the rack at the central office, it is convenient to place all components, including the filter components, the chokes, and the surge protectors on one surface of the substrate of the card. In a similar fashion, a low pass filter is employed in a subscriber station in series with a telephone for noise reduction.

It is noted also that, the features of construction of the filters are useful also for connection of the telephone channel, the twisted pair of wires, at a subscriber terminal. With respect to emplacement of a low pass filter at the entry point of the twisted pair at a subscriber home or other facility, it is noted that a suitable electrical configuration of the low pass filter is the same as that described above for the filters located on the card. However, in the case of the card mounted filter at the central office, the filter design is for an impedance of 900 ohms while, for the filter located at the subscriber entry point, the filter design is for 600 ohms. To accomplish this change of impedance, the values of the filter components of the subscriber low pass filter differ from the values of the corresponding components of the central-office low pass filter.

Locating a low pass filter at the subscriber entry point allows a filtered incoming signal to be split among plural telephone circuits of the subscriber. Alternatively, such a filter may be connected to each subscriber telephone, in which case the power splitting filter at the entry point is not needed. The subscriber filter may be constructed on a substrate using toroid inductors in a manner similar to that described above for the central office filters. However, the construction of the subscriber low pass filter is simpler than the construction of the central office card because the components of only one filter channel are supported by the substrate of the subscriber filter.

BRIEF DESCRIPTION OF THE DRAWING

The aforementioned aspects and other features of the invention are explained in the following description, taken in connection with the accompanying drawing figures wherein:

FIG. 10 comprises FIGS. 10A, 10B and 10C which show a housing enclosing the circuitry of FIGS. 8 and 9;

FIG. 13 comprises FIGS. 13A, 13B and 13C which show a telephone mounting fixture adapted for receipt of the filler of FIGS. 8 or 11.

Identically labeled element appearing in different ones of the figures refer to the same element but may not be referenced in the description for all figures.

DETAILED DESCRIPTION OF THE INVENTION

Figure 1:
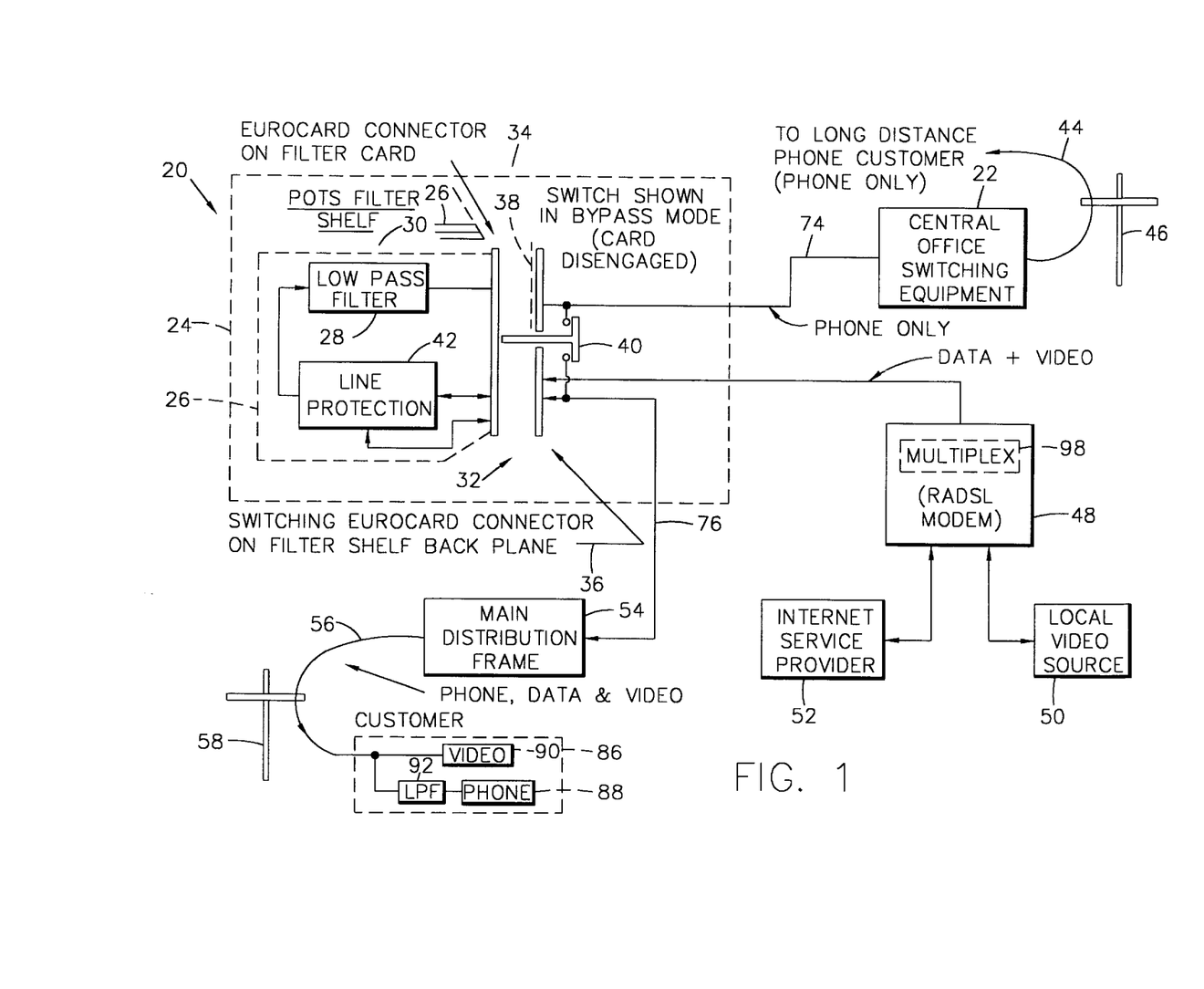
FIG. 1 shows diagrammatically the components of a telephone communication system including a shelf of filter cards interconnecting central office equipment with customer premises.

FIG. 1 shows diagrammatically interconnections among components of a telephone communication system 2 including central office switching equipment 22 and an assembly of racks which may be referred to as a cabinet 24 for housing filter cards 26. The cards 26 contain filters 28 for respective ones of subscribers channels of the communication system 20. The switching equipment 22 and the cabinet 24 are located in a telco of the system 20. Within the cabinet 24 numerous ones of the filter cards 26 are arranged on racks or shelves 30 permitting easy connection and replacement of individual ones of the cards 26 by means of connection assembly 32. In accordance with a feature of the invention, the connection assembly 32 includes a plurality of socket connector elements 34 mounted to respective ones of the filter cards 26, and a plurality of pin connector elements 36 located on a back plane circuit board to be referred to as a back plane 38 of the filter shelves 30. Also included within the connection assembly 32 is a set of switches 40 connected in respective ones of the subscriber telephone channels for bypassing signals, as will be described in further detail, during replacement of a filter card 26, and line protection element 42 located on respective ones of the cards 26 for protection of the respective cards 26 from electric surges.

In the operation of the system 20, long distance telephone communications are provided via lines 44, shown carried by telephone poles 46, to and from the switching equipment 22. Long distance transmission of video and/or data, as well as Internet services is provided by a set of modems 48, for RADSL service, connected via the back plane 38 to respective ones of the subscriber channels. The modems 48 provide connection between the respective channels to a local video source 50 and an Internet service provider 52. Connection to each of many local telephone customers is provided via a main distribution frame 54 of e telco connected between socket connector elements 36 of the back plane 38 and phone lines 56, shown carried by telephone poles 58 to the customer premises.

As has been discussed above, the filter cards 26 are to be arranged, in accordance with the invention, in a manner which facilitates replacement of defective ones of the cards 26 while ensuring minimum downtime of the communication system 20 and minimal inconvenience to the customers. To accomplish this objective, numerous filter circuits for numerous ones of the subscriber channels are constructed on a single one of the filter cards 26, and numerous ones of the filter cards 26 are contained within a single one of the shelves 30 of the cabinet 24. Furthermore, the arrangement and physical configuration of the connector elements 34 and 36 of the connection assembly 32 permits an individual one of the filter cards 26 to be installed or removed with automatic bypassing of critical telephone communication during the process of replacement of the filter cards 26.

Each of the filters 28 comprises both inductors and capacitors to provide a low-pass frequency response over a range of 0–4 kEz. Reduction in the physical size of the individual filter circuits of the respective filters 28 is accomplished by the use of toroidal inductors formed with toroidal cores comprising strata of amorphous metals which allows for relatively large telephone circuit currents (100 mA plus signal current) without saturation of the core and without inducing excessive signal loss. These features of the invention of described below in further detail.

Figure 2:
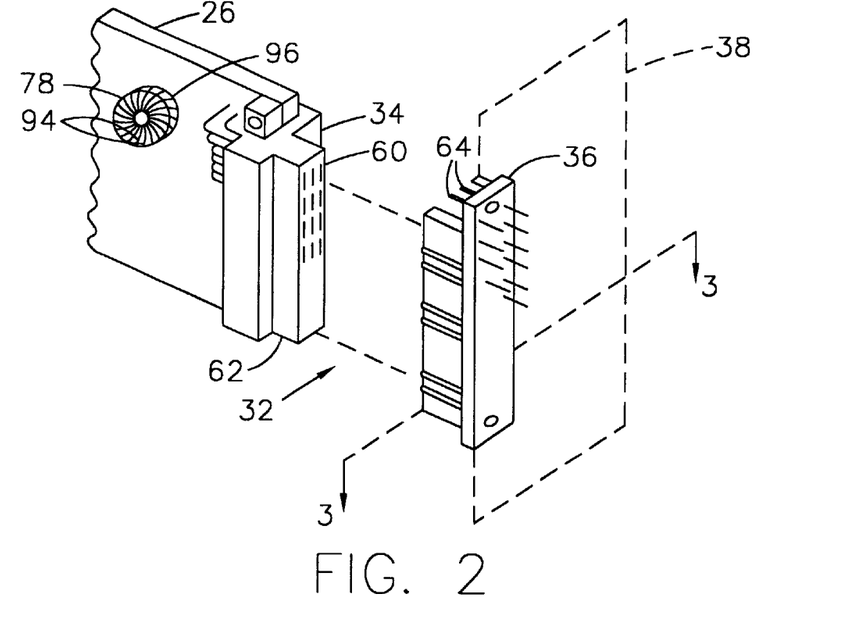
FIG. 2 is an enlarged fragmentary view of a filter card of FIG. 1.
Figure 3:
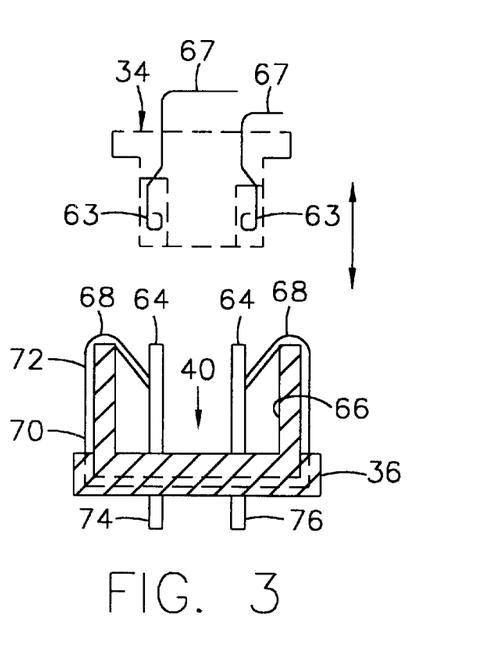
FIG. 3 is a sectional view through a connector element taken along the line 3—3 of FIG. 2.

As shown in FIGS. 2 and 3, the socket connector element 34 comprises a set of pin-receiving cavities 60 disposed on a tongue 62 of the element 34, wherein only a few of the cavities 60 are shown to simplify the drawing. The socket connector element 34 is affixed to one end of the filter card 26. The cavities 60 are arranged parallel to each other and include metallic liners 63 to contact corresponding set of pins 64 of the socket connector element 36 upon insertion of the tongue 62 into a receiving slot 66 of the pin connector element 36. Various ones of the cavities 60 connect with various terminals of the low pass filters 28, as shown by lines 67 connected to the cavity liners 63, wherein various ones of the cavities 60 are assignee to the video and voice signals of various ones of the communication channels of the system 20 of FIG. 1.

In the case of cavities 60 reserved for communication of voice telephony signals, the bypass switch 40 is operatively connected between a pair of corresponding mating pins 64 in each of the respective channels. For each of the channels, the switch 40 is constructed as a strip conductor terminating in a pair of spring loaded tangs 68 positioned for contacting a corresponding par of the pins 64. The strip conductor, as indicated at 70, is partially embedded within the insulating material of the connector element 36, as shown in phantom, to serve as a shorting bar between a corresponding pair of the pins 64. The movable outer ends 72 of the tangs 68 are free to swing out and contact the corresponding pair of the pins 64 under the condition wherein the tongue 62 is at a distance from the receiving slot 66. Upon insertion of the tongue 62 into the receiving slot 66, the tongue 62 pushes against the tangs 68, at d forces the tangs 68 away from the pair of the pins 64. Thereby, upon insertion of the tongue 62 into the receiving slot 66, the pins 64 connect the filter card 26 to voice telephone lines 74 and 76, shown also in FIG. 1, to enable operation of the filter 28 and the protection element 42 within the corresponding communication channel of the system 20. Upon extraction of the filter card 26 from the shelf 30, the tangs 68 move back short the pair of pins 64 to form the bypass between the telephone lines 74 and 76.

This construction of the switch 40 avoids the need for a separate relay circuit, such as that disclosed in the aforementioned provisional applications. However, it is noted that in the event it is desired to us a standard form of connector without modification of the connector to include the tang 68, then the bypass arrangement disclosed in the aforementioned provisional patent applications may be employed wherein one contact of the connector for each of the filter cards 26 may be employed for activation of a bypass relay.

Figure 4:
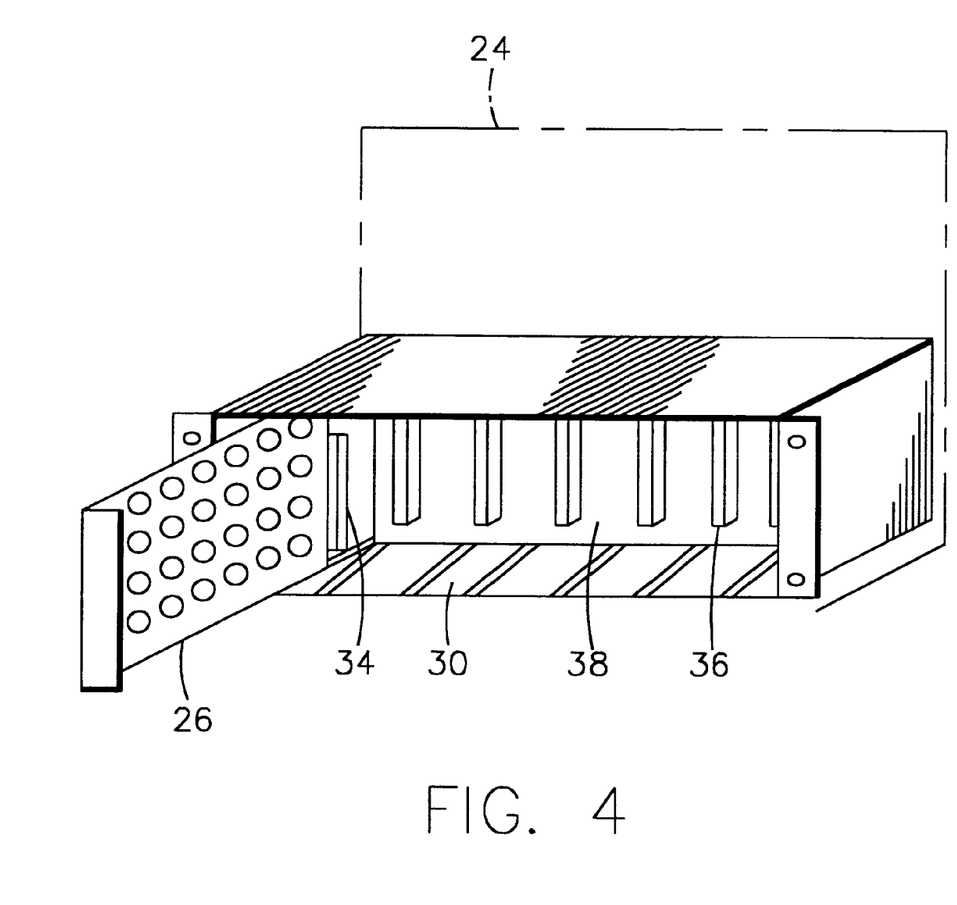
FIG. 4 is a stylized view of a cabinet containing plural shelves of the filter cards.

The foregoing construction of the filter cards 26 facilitates emplacement of the cards 26 in the arrangement of shelves 30 within the cabinet 24, as illustrated in FIG. 4. The pin connector elements 36 which receive the socket connector elements 34 of the respective cards 26 are located along the back plane 38, also illustrated in FIG. 4. Thereby, the cards are accessible t maintenance personnel, and are readily serviced by extraction and insertion into the respective shelves 30.

Figure 5:
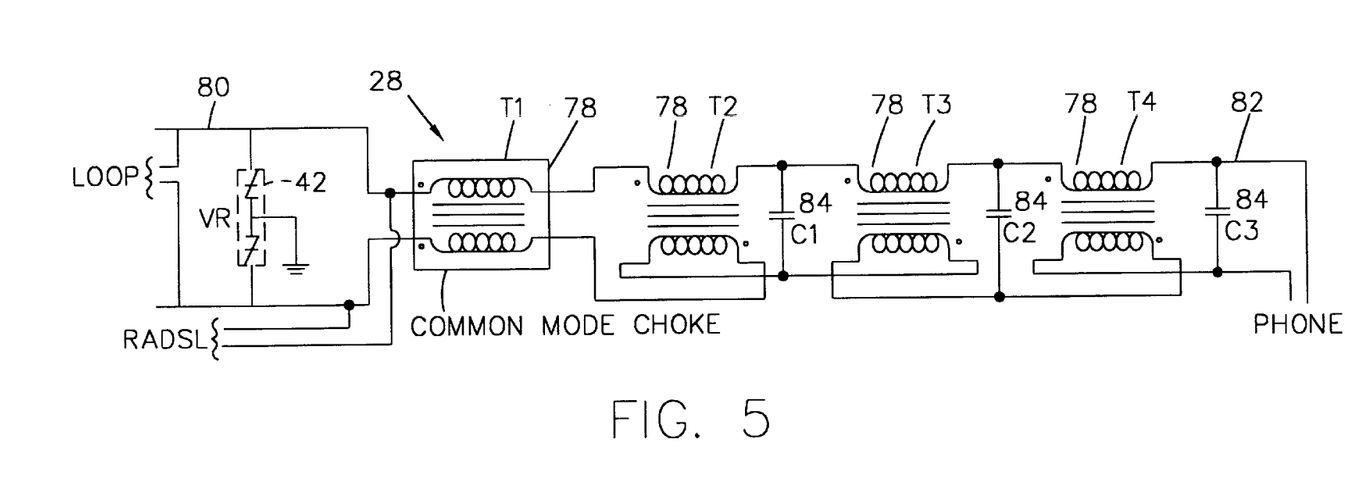
FIG. 5 shows an electrical schematic diagram of one of a plurality of low pass filters located on a filter card of FIG. 1.
Figure 6:
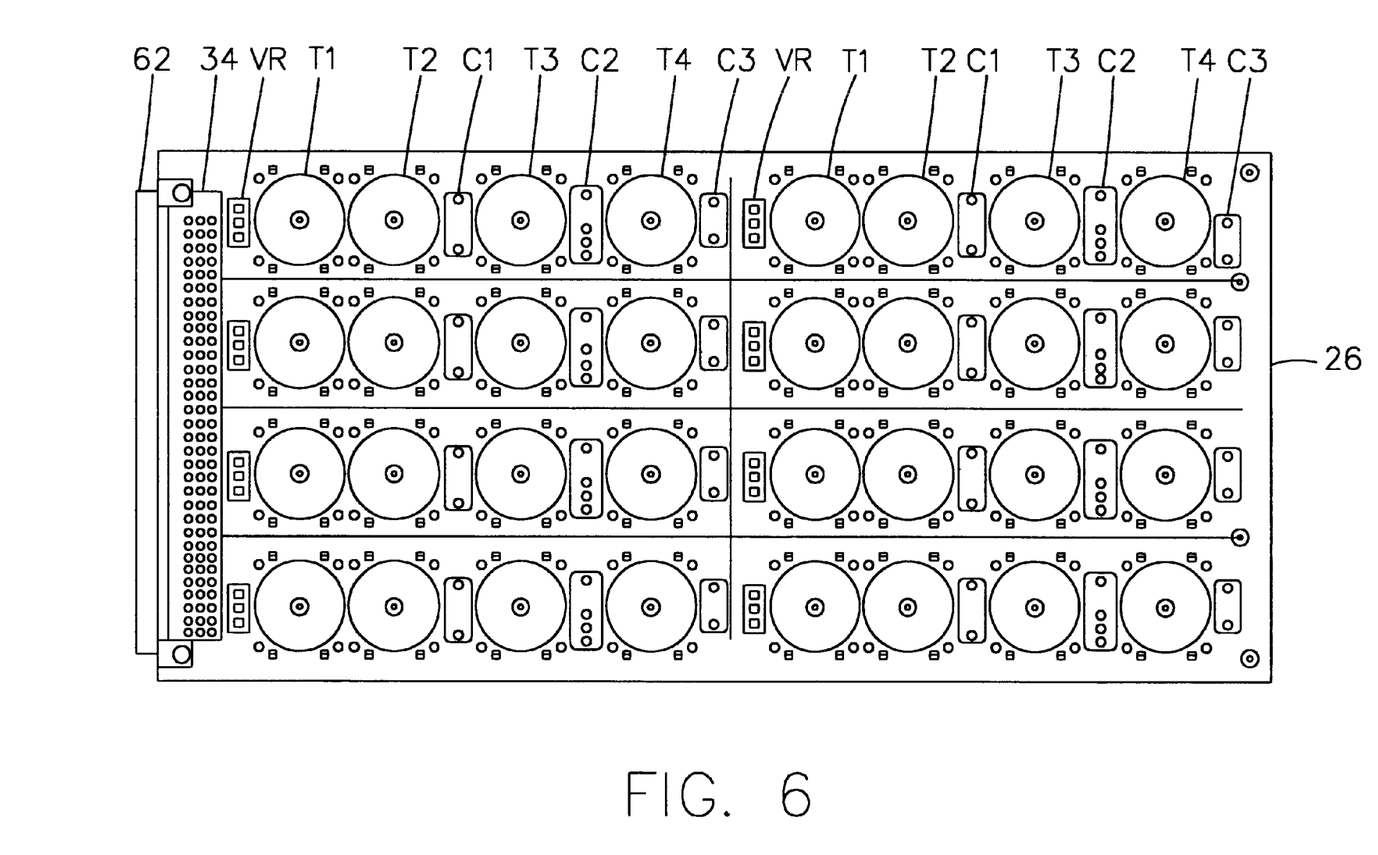
FIG. 6 is a plan view of one of the filter cards, the view showing locations of inductors and capacitors of a set of 8 low pass filters disposed on the filter card.

With reference to FIGS. 5 and 6, FIG. 5 shows the schematic diagram of a filter 28 disposed on a filter card 26 (FIG. 1). In a preferred embodiment of the invention, it has been found to be efficient to construct eight of the filters 28 on a single one of the filter cards 26, wherein the arrangement of the filters 28 is shown in FIG. 6. In the arrangement, the components of a filter 28 are arranged serially along a row on the card 26, there being two of the filters 28 within one of the rows. A total of four rows within the card 26 provides for a total of eight of the low pass filters 28.

As shown in FIG. 5, the fiter 28 comprises four toroidal double-wound inductors 78 of which individual ones of these inductors 78 are further identified as inductors T1, T2, T3 and T4. In the inductor T1, there are two windings which are wound and connected to their respective so as to serve as a common mode choke which introduces cancellation of relatively high frequency component signals, such as video signals, which may be present at the filter 28. The four inductors 78 are connected serially between a first end 80 of the filter 28, and a second end 82 of the filter 28. Audio signals can travel in either direction in the filter 28 so that either end 80 or 82 may be regarded as its input end. The inductors T2, 13 and T4 have their respective windings arranged with connection of their respective signals so that an audio signal input at end 80 can travel along the filter 28 without interference from a video/data signal input at end 80. Therefore, within the audio frequency range, the filter 28 is reciprocal to the flow of signal in either direction. Three capacitors 84, further identified as capacitors C1, C2 and C3, are included within the circuitry of the filter 28, wherein the capacitors C1, C2 and C3 follow respective ones of the inductors T2, T3 and T4. The configuration of the filter 28 is recognized as a double ladder wherein the coils of the inductors are located at side arms of the ladder, and the capacitors 84 are connected across the side arms between terminals of the inductors.

The configuration of the circuitry of the filter 28 of FIG. 5 provides for six poles in its frequency response, the frequency response extending from DC up to approximately 4 kHz. The six-pole response provides for a sufficiently sharp cut off in the frequency response to avoid contamination of the audio signal with any frequency components of the relatively high-frequency video/data signals described hereinabove with reference to FIG. 1. The surge protection element 42 comprises a sidactor, identified in the figure as VR, and is connected across the two input terminals at the end 80 of the filter 28, and includes a center tap connected to ground. By way of example in the construction of a filter 28, the common mode choke T1 has an inductance of 8 mH. Each of the inductors T2, T3 and T4 has an inductance of 15.3 mH. The capacitors C1, C2 and C3 have values of capacitance of, respectively, 0.08 uF, 0.056 uF, and 0.015 uF. The filter 28 has a line impedance of 900 ohms.

The high-frequency video/data RADSL service lines, described above with reference to FIG. 1, also come in contact with the terminals at the first end 80 of the filter 28. The card 26 (FIG. 6) also carries the RADSL service lines to the respective ones of the filters 28, these lines having been deleted in FIG. 6 to simplify the drawing. As noted in FIG. 1, connections to the filter 28 for any one customer channel include the central office switching equipment 22 for access to the long distance phone customer, the modems 48 connecting with the video/data of the RADSL service, and to the telephone of the customer premises 86. These three connections are also found in the filter 28, as shown in FIG. 5. Thus, in addition to the RADSL service lines at the first end 80, the terminals at the first end 80 also connect with the telephone loop (tip and ring lines) of the central office switching equipment 22, and the second end 82 of the filter 28 is connected via the main distribution frame 54 to a phone, such as the telephone 88 at the customer premises 86. The RADSL service is brought along two conductors which serve also for transmission of voice signals for phone service at the telephone 88. This leaves two spare lines in the case of four-conductor cable as, for example, in the line 56 (FIG. 1). Therefore, the customer has, in add ion to the phone service, also the video, shown at 90, and is also provided with a further low pass filter 92 for separation of the phone and the video signals.

An important feature of the invention is the arrangement of the filter components on the card 26, the shown in FIG. 6. This convenient arrangement is enabled by use of a construction of the inductors 78 in which each of the inductors 78 has of a form of a toroid. By way of example, one such toroidal inductor 78 is presented on the card 26 in FIG. 2, the inductor 78 being presented for purposes of illustration, it being understood that numerous ones of the inductors 78 are present, as shown in FIG. 6. As shown in FIG. 2, the inductor 78 comprises winding turns 94 disposed on a toroidal core 96 in radial planes of the core 96.

As it is well known in the construction of inductors, the amount of inductance is dependent on the number of turns of the wire, and is dependent also on the volume of the core material enclosed by the wound wire. Therefore, to construct an inductor of specified inductance on a relatives core, additional turns of wire are required. This introduces a problem in the situation wherein a relatively large amount of current, such as the aforementioned DC ring current of 100 mA, is present because the large amount of current may place the material of the core in saturation. The condition of saturation is to be avoided in an inductor employed in a filter because this introduces changes in the inductance and the frequency response of a filter processing the aforementioned telephone audio signal.

There are two solutions to his problem, namely, the use of a relatively large core volume with a reduced number If winding turns, as taught in the above referenced provisional patent applications, wherein inductors are arranged on both sides of a substrate. Alternatively, as in the preferred embodiment of the invention, one may use a core material that resists saturation. This results in a construction of the filter 28 with inductors of relatively small physical size and enables the arrangement of the filter components on one side of the subs rate, as shown in FIG. 6.

The inductor core employed in the preferred embodiment of the invention is fabricated of amorphous metals, including NiFe, disposed in circumferential strata about a central point of the toroidal core. Such a core, is referred to as a tape-wound core. As a result, in the arrangement of the preferred embodiment (FIG. 6), the outer diameter of the inductor, core plus windings, is comparable in size to the transverse dimensions of one of the capacitors 84. As a result, all of the components of a filter 28, as depicted in FIG. 5, may be arranged serially along a row of the card 26. In addition, the magnetic field of a toroidal inductor is contained, almost completely, within the core, thereby avoiding mutual inductance among the inductors of a single filter as well as with inductors of neighboring filters.

With reference again to FIG. 1, it may be desirable to reduce the total number of modems 28 by use of multiplex equipment, indicated at 98, to allow a sharing of the available modems 48 among a much larger number of customers. Such modems may be positioned along the back plane 3, indicated in FIG. 4. This produces an overall compact configuration to the cabinet 24.

Figure 7:
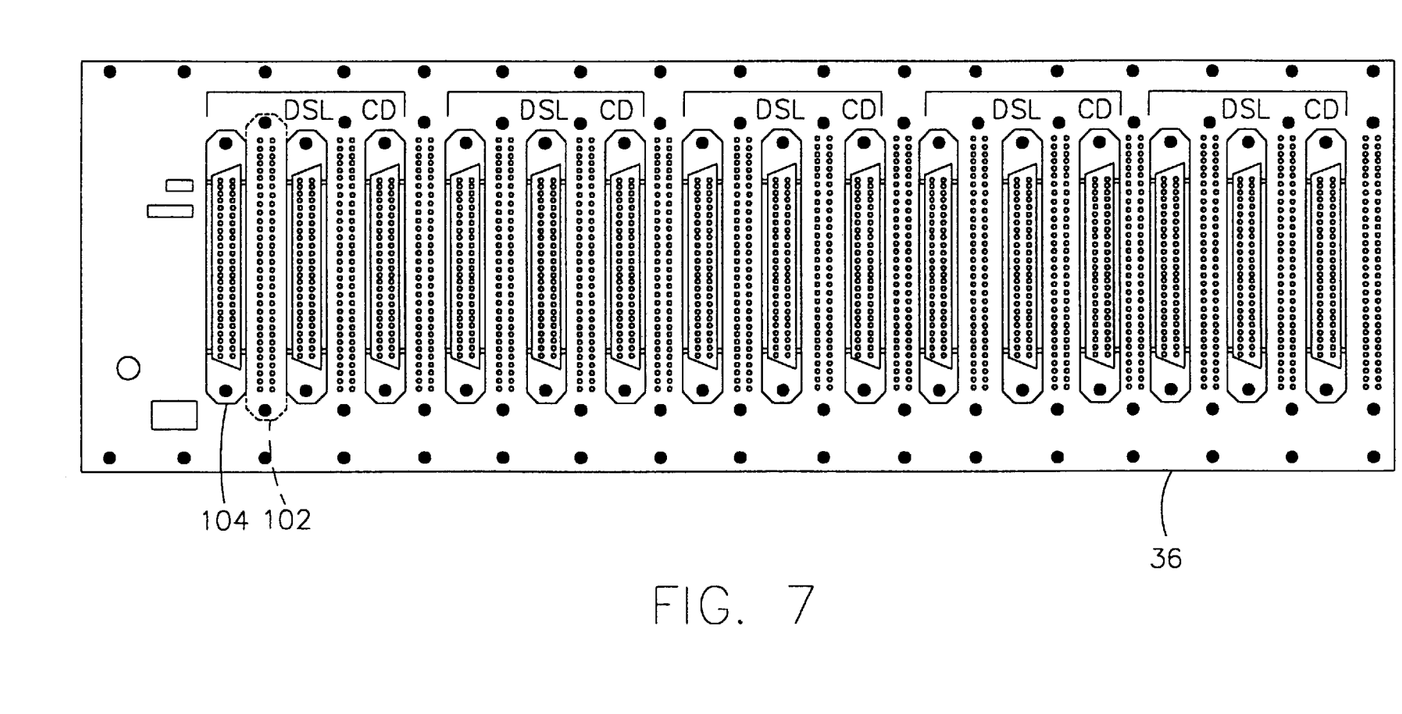
FIG. 7 is a plan view o an array of socket connector elements located along a back plane in a cabinet of FIG. 1 for supporting an array of the filter cards disposed as a shelf in the cabinet.

FIG. 7 shows a plan view of the assembly of the pin connector elements 36, previously described with reference to FIG. 2. The view of FIG. 7 shows the back side of a connector elements 36, the backside being opposite the front side which mates with the cards 26. The front side is indicated in phantom at 102 and includes the receiving slots 66 portrayed in FIG. 7 as simply a set of dots representing the connector pins within the slot 66. The back side is portrayed in solid line at 104, and shows a set of connectors which provide electrical connection to points external to the rack such as the switching equipment 22 (FIG. 1). These connectors are to be described further with reference to FIG. 14 where they are identified as connectors J17, J20 and J23.

Figure 8:
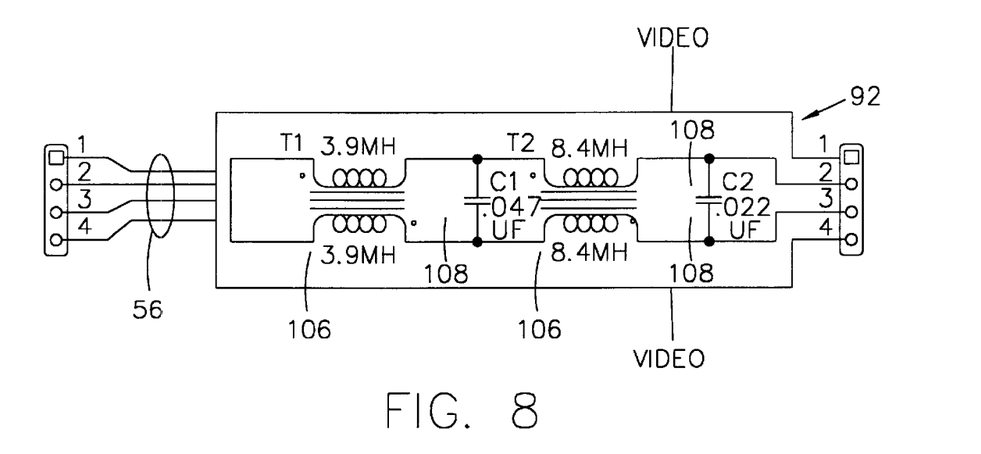
FIG. 8 is an electrical schematic diagram of a filter, similar to construction of a filter of FIG. 5, and a suitable for use at customer premises.
Figure 9:
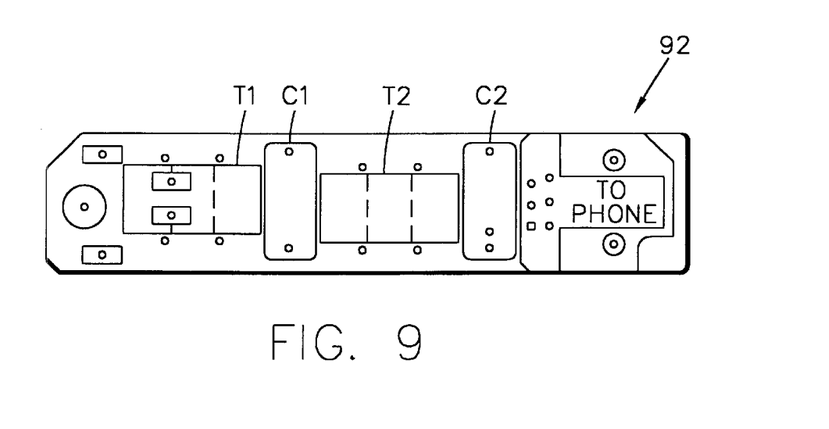
FIG. 9 is a plan view of the filter of FIG. 8.

With reference to FIGS. 8 and 9, there is provided a description of the low pass filter 92 located at the customer premises 86 (FIG. 1). The filter 92 comprises two inductors 106 comprising a double-wound toroidal core of the same material as that disclosed for the filter 28 (FIG. 5). The filter 92 has the configuration of a double ladder network, as does of the filter 28, wherein the inductors form the side rails. The filter 92 further comprises two capacitors 108 connected transversely across the ladder between terminals of the inductors 106. For ease of reference, the inductors 106 are further identified as T1 having a value of 3.9 mH and T2 having a value of 8.4 mH. The capacitors 108 are further identified as C1 having a value of 0.047 uF and C2 having a value of 0.022 uF. The line impedance of the filter 92 is 600 ohms. This configuration of filter is a four-pole filter with values of inductance and capacitance being selected to provide for a sharp cut-off spectral characteristic beyond the audio frequency range. The filter components are arranged serially along a substrate, as shown in FIG. 9. The filter 92 connects with two conductors of the incoming line 56. Even though the line 56 four conductors, only two of the conductors serve for the transmission of voice and video/data signals. The filter 92 is operative to prevent passage of the video signals to a telephone but communicates the audio signals via the filter components to a terminus of the filter connecting with the telephone 88 (FIG. 1). By preventing passage of the video signals to the telephone, the filter 92 insures clarity of the received voice signal by preventing the generation of intermodulation products among the video and data signals into the telephone. The remaining two conductors of the line 56 serve no function with respect to the transmission of the voice and he video signals, but serve as a bypass about the filter for providing electric power, by way of example, for powering an electrical device such as a lamp.

Figure 10A:
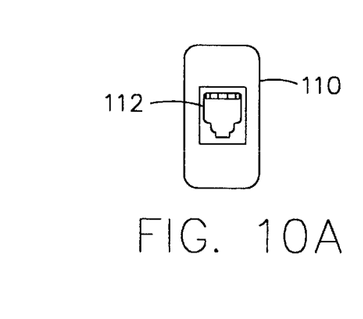
Figure 10B:
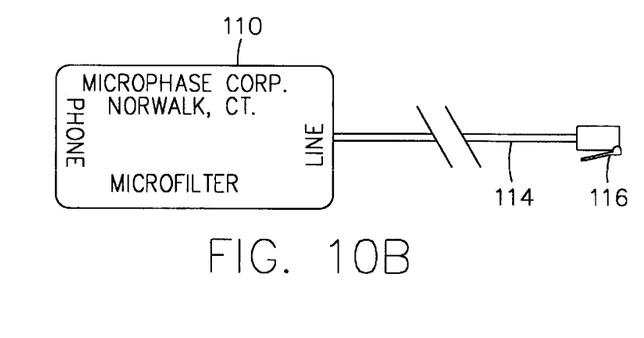
Figure 10C:
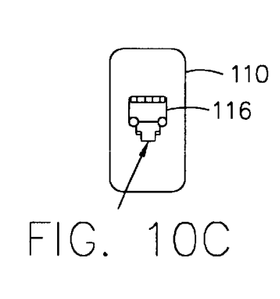

FIG. 10 shows a modular housing 110 suitable for enclosing the filter 92 of FIGS. 8 and 9. FIG. 10B shows a side view of the housing 110, with a left end (FIG. 10A) having a socket 112 for receiving a four-conductor cable, and a right end (FIG. 10C) having a four-conductor cable 114 with a slug 116 connected thereto. The physical size of the modular housing 110 is sufficiently small to permit connection of the filter 92 within an existing telephone line found on customer premises.

Figure 11:
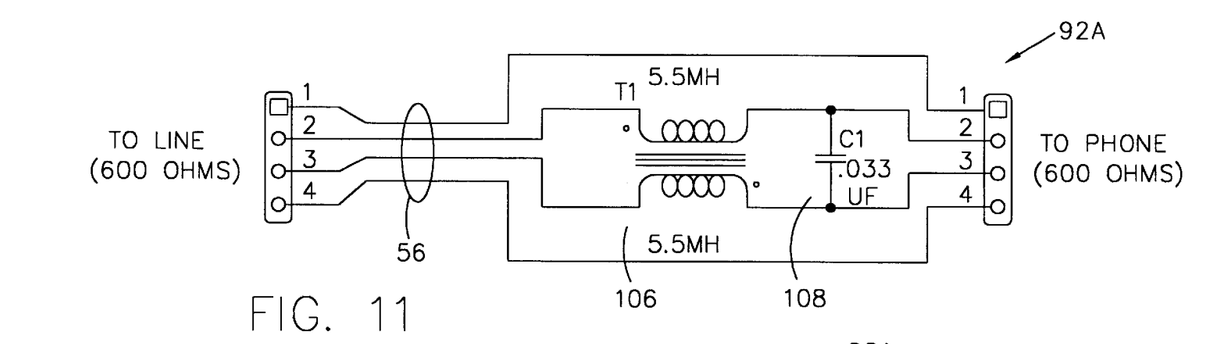
FIG. 11 shows a circuit similar to that of FIG. 8.
Figure 12:
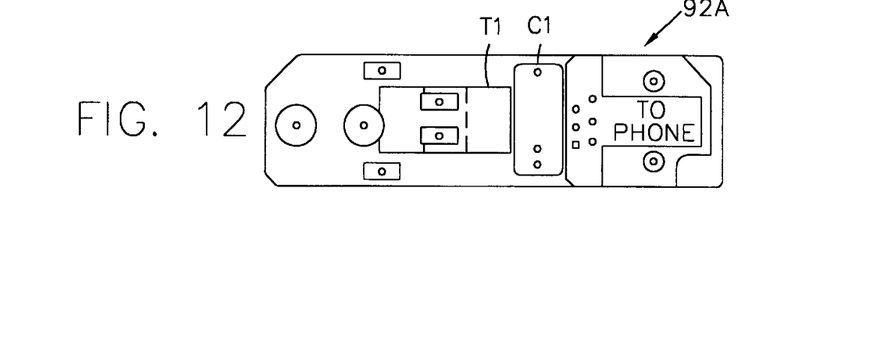
FIG. 12 is a plan view of the circuit of FIG. 11.

FIGS. 11 and 12 shown an alternative configuration of the filter 92, identified in FIGS. 11 and 12 as 92A. The description provided above with reference to FIGS. 8 and 9 applies also to the filter of FIGS. 11 and 12 except that, in the case of the filter 92A, there is only one inductor 106 and one capacitor 108 having values respectively of 5.8 mH and 0.033 uF. The filter has a line impedance of 600 ohms. The filter 92A can be housed within the modular housing 110, or even within a housing (not shown) smaller than the housing 110.

Figure 13A:
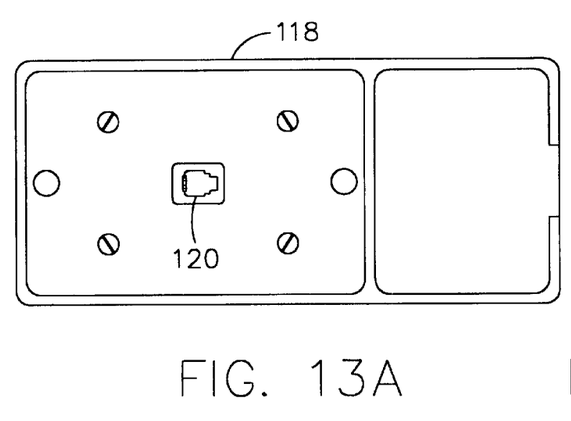
Figure 13B:
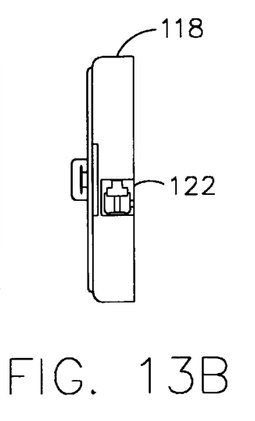
Figure 13C:
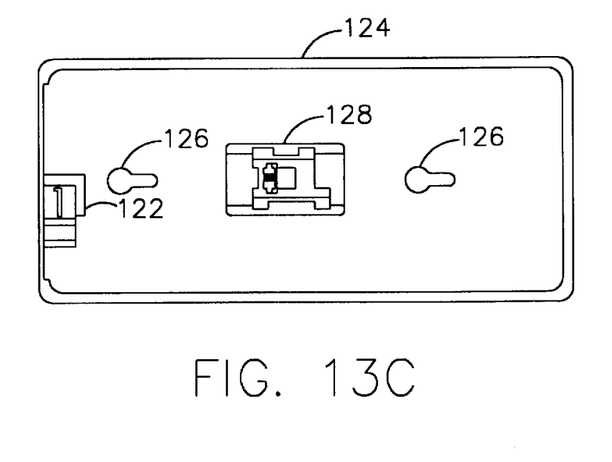

FIG. 13 shows a wall fixture 118 in the form of a mounting plate wherein, in FIG. 13A there is shown the backside which faces a wall and incudes a socket 120 for connection with an external telephone line. FIG. 13B shows an end view of the fixture 118 having a socket 122 for receiving a cord for electrical connection of video, data and voice signals. FIG. 13C shows a cover plate 124 which is attached to the fixture 118 with the aid of screw-receiving holes 126. The plate 124 has a plug 128 for making electrical connection with conductors disposed within a wall to which the filter 118 is to be mounted. The low-pass filter 92 or 92A is readily attached to the plate 124. This demonstrates the convenience of the physically small size of the filter 92 or 92A for mounting within various existing packages.

Figure 14:
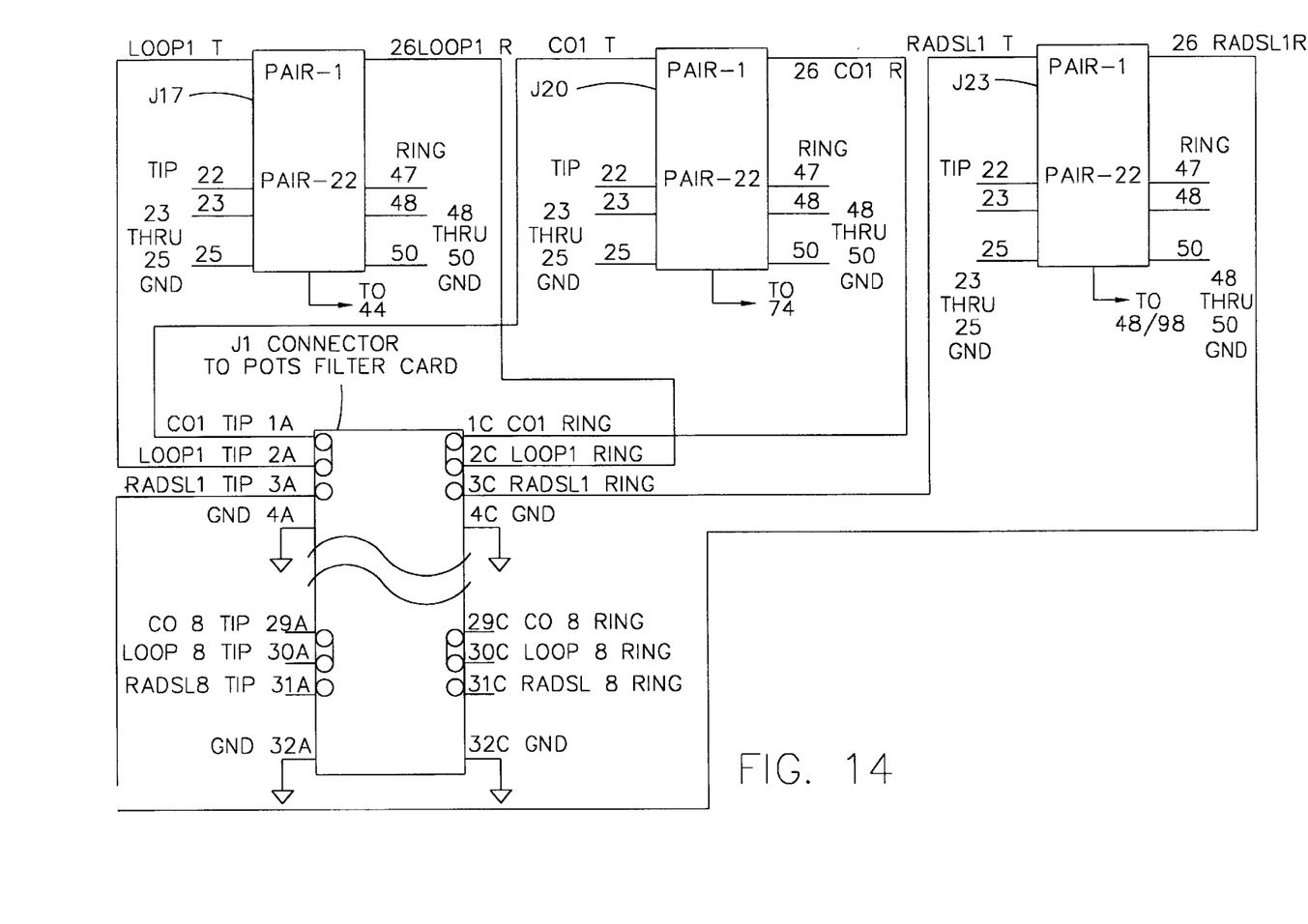
FIG. 14 is a wiring diagram showing interconnection of telephone conductors within the equipment of FIG. 1.

The connections of the telephone signal lines in FIG. 1 are explained in greater detail in FIG. 14. Various connectors through which the signal wires are routed are identified by the legends J1, J17, J20 and 323. The J1 connector is located at the back plane 38 and provides for interconnection of the signal lines between respective ones of the filters 28 and other parts of the communication system 20. Both tip and ring lines of a loop are shown, as well as tip and Wing lines of RADSL. Loop tip and ring lines are routed via the 317 connector to the lines F4 (FIG. 1). Connection between the back plane 38 and lines 74 (FIG. 1) is made via the 20 connector. Connection between the back plane 38 and the RADSL is made via of the J23 connector.

It is to be understood that the above described embodiments of the invention are illustrative only, and that modifications thereof may occur to those skilled in the art. Accordingly, this invention is not l be regarded as limited to the embodiments disclosed herein, but is to be limiter only as defined by the appended claims.

What is claimed is:

1. A filter for reduction of noise in telephony equipment, comprising:
    a first plurality of inductors connected in series in a first leg of a balanced line configuration of fiter;
    a second plurality of inductors connected in series in a second leg of said balanced line configuration of filter;
    a plurality of capacitor connected as cross branches between terminals of the inductors; and
    a substrate for supporting the capacitors and the inductors, wherein said inductors are toroidally wound inductors comprising toroidal cores of magnetic saturation inhibiting material, the saturation inhibiting core material allowing reduction in size of a cross-sectional dimension of each of the cores to approximately the cross-sectional dimension of one of said capacitors; and
    wherein there is an inductor of said first plurality of inductors which is positioned in said balanced line symmetrically to an inductor of said second plurality of inductors, symmetrically positioned ones of said inductors sharing a common one of said toroidal cores for reduction in size of the filter.

2. A filter according to claim 1 further comprising a modular housing enclosing said inductors and said capacitors and said substrate.

3. A filter according to claim 2 wherein said housing is configured for reception within a wall-mounting bracket of a telephone handset.

4. A filter according to claim 1 wherein said core material comprises amorphous metallic substances arranged in encircling strata of said core.

5. A filter assembly for use in a telephone central office for separation of video signals from voice signals, the assembly comprising:
    a plurality of cards mounted in a rack, wherein each of said cards comprises a plurality of filters, each of said filters comprising:
        a first plurality of inductors connected in series in a first leg of a balanced line configuration of filter;
        a second plurality of inductors connected in series in a second leg of said balance line configuration of filter;
        a plurality of capacitors connected as cross branches between terminals of the inductors;
        a substrate for supporting the capacitors and the inductors; and
        wherein said inductors are toroidally wound inductors comprising toroidal cores and, in each of the filters, there is an inductor of said first plurality of inductors which is positioned in said balance line symmetrically to an inductor of said second plurality of inductors, symmetrically positioned ones of said inductors sharing a common one of said toroidal cores for reduction in size of the filter;
    said assembly further comprises a set of connectors mounted in a back plane of an enclosure for receiving said cards; and
    a plurality of bypass switches disposed in said set of connectors for bypassing said voice signals around corresponding ones of said cards, said bypass switches being placed, mechanically, in a state of conduction upon removal of a corresponding one of said cards from said set of connectors.

6. A filter assembly for use in a telephone central office for separation of video signals from voice signals, the assembly comprising:
    a plurality of card mounted in a rack, wherein each of said cards comprises a plurality of filters, each of said filters comprising:
        a first plurality of inductors connected in series in a first leg of a balanced line configuration of filter;
        a second plurality of inductors connected in series in a second leg of said balanced line configuration of filter;
        a plurality of capacitors connected as cross branches between terminals of the inductors;
        a substrate for supporting the capacitors and the inductors; and
    wherein said assembly further comprises a set of connectors mounted in a back plane of an enclosure for receiving said cards;
    a plurality of bypass switches disposed in said set of connectors for bypassing said voice signals around corresponding ones of said cards, said bypass switches being placed, mechanically, in state of conduction upon removal of a corresponding one of said cards from said set of connectors;
    said inductors are toroidally wound inductors comprising toroidal cores of magnetic saturation inhibiting material, the saturation inhibiting core material allowing reduction in size of a cross-sectional dimension of each of the cores to approximately the cross-sectional dimension of one of said capacitors; and
    wherein, in each of the filters, there is an inductor of said first plurality of inductors which is positioned in said balanced line symmetrically to an inductor of said second plurality of inductors, symmetrically positioned ones of said inductors sharing a common one of said toroidal cores for reduction in size of the filter.

7. A filter assembly according to claim 6 wherein said core material comprises amorphous metallic substances arranged in encircling strata of said core.

8. A filter assembly according to claim 6 wherein, in any one of said cards, the inductors and capacitors of one of said filters are positioned serially in a row.

9. A filter assembly according to claim 8 wherein, in any one of said cards, a plurality of said filters is located in a single row of said card, there being a plurality of rows of said filters in said card.

10. A filter for separation of voice and video signals in a telephony communication channel, comprising:
   a first plurality of inductors connected in series in a first leg of a balanced line configuration of filter, each of said inductors having a toroidal configuration;
   a second plurality of inductors connected in series in a second leg of said balanced line configuration of filter;
   a plurality of capacitors connected as cross branches between terminals of the inductors, each of said inductors having a toroidal configuration;
   a substrate for supporting the capacitors and the inductors, wherein the inductors and the capacitors are mounted on one side of the substrate with axes of toroids of the inductors being parallel; and
   wherein there is an inductor of said first plurality of inductors which is positioned in said balanced line symmetrically to an inductor of said second plurality of inductors, symmetrically positioned ones of said inductors sharing a common one of said toroidal cores for reduction in size of the filter for reduction in size of the filter.

11. A filter according to claim 10 further comprising a modular housing enclosing said inductors and said capacitors and said substrate.

12. A filter according to claim 11 wherein said housing is configured for reception within a wall-mounting bracket of a telephone handset.

13. A filter according to claim 10 wherein said core material comprises amorphous metallic substances arranged in encircling strata of said core.

14. A filter assembly for separation of voice and video signals in a telephony communication channel, comprising:
   a plurality of filters, each of said filters comprising:
      a first plurality of inductors connected in series in a first leg of a balanced line configuration of filter;
      a second plurality of inductors connected in series in a second leg of said balanced line configuration of filter;
      a plurality of capacitors connected as cross branches between terminals of the inductors;
      a substrate for supporting the capacitors and the inductors;
      wherein said inductors are toroidally wound inductors comprising toroidal cores of magnetic saturation inhibiting material, the saturation inhibiting core material allowing reduction in size of a cross-sectional dimension of each of the cores to approximately the cross-sectional dimension of one of said capacitors; and
      wherein, in each of the filters, there is an inductor of said first plurality of inductors which is positioned in said balanced line symmetrically to an inductor of said second plurality of inductors, symmetrically positioned ones of said inductors sharing a common one of said toroidal cores.

15. A filter assembly according to claim 14 wherein said core material comprises amorphous metallic substances arranged in encircling strata of said core.

16. A filter assembly according to claim 14 wherein the inductors and capacitors of one of said filters are positioned serially in a row.

17. A filter assembly according to claim 16 wherein a plurality of said filters is located in a single row of said assembly, there being a plurality of rows of said filters in said assembly.

18. A filter for passing a voice signal in telephony equipment, comprising:
   a first plurality of inductors connected in series in a first leg of a balanced line configuration of filter;
   a second plurality of inductors connected in series in a second leg of said balance line configuration of filter;
   a plurality of capacitors connected as cross branches between terminals of the inductors; and
   a substrate for supporting the capacitors and the inductors, wherein a pair of the inductors located at opposite ends of individual ones of said cross branches are wound toroidally about a common toroidal core of magnetic saturation inhibiting material for reduction in size of the filter, the saturation inhibiting core material comprising amorphous metallic substances arranged in encircling strata of said core for allowing reduction in size of a cross-sectional dimension of the core to approximately the cross-sectional dimension of one of said capacitors;
   wherein the inductors in the first leg and the inductors in the second leg are operative to carry a ring current without undergoing a saturation of a core;
   there is an inductor of said first plurality of inductors which is positioned in said balanced line symmetrically to an inductor of said second plurality of inductors, symmetrically positioned ones of said inductors sharing a common one of said toroidal cores; and
   wherein the inductors and the capacitors are mounted on one side of the substrate with axes of toroids of the inductors being parallel, and the toroidally wound inductors and the capacitors are arranged in a single line to obtain a compact configuration of the filter.

19. A filter assembly for use in a telephone central office or separation of video signals from voice signals, the assembly comprising:
   a plurality of cards mounted in a rack, wherein each of said cards comprises a plurality of filters, each of said filters comprising:
      a first plurality of inductors connected in series in a first leg of a balanced line configuration of filter;
      a second plurality of inductors connected in series in a second leg of said balanced line configuration of filter;
      a plurality of capacitors connected as cross branches between terminals of the inductors;
      a substrate for supporting the capacitors and the inductors; and
      wherein said assembly further comprises a set of connectors mounted in a back plane of an enclosure for receiving said cards, each of the connectors being configured as a cavity for engaging a corresponding one of the cards upon insertion of the card in the cavity;
   said inductors are toroidally wound inductors comprising toroidal cores and, in each of the filters, there is an inductor of said first plurality of inductors which is positioned in said balanced line symmetrically to an inductor of said second plurality of inductors, symmetrically positioned ones of said inductors sharing a common one of said toroidal cores for reduction in size of the filter; and
   a plurality of bypass switches disposed in said set of connectors for bypassing said voice signals around corresponding ones of said cards, each of said switches including a conductor extensible across the cavity of the corresponding connector in the absence of the corresponding card, and said bypass switches being placed, mechanically, in a state of conduction upon removal of a corresponding one of said cards from said set of connectors.

20. A filter assembly for separation of voice and video signals in a telephony communication channel, comprising:

a plurality of filters, each of said filters comprising:

a first plurality of inductors connected in series in a first leg of a balanced line configuration of filter;

a second plurality of inductors connected in series in a second leg of said balanced line configuration of filter;

a plurality of capacitors connected as cross branches between terminals of the inductors; and a substrate for supporting the capacitors and the inductors, wherein a pair of the inductors located at opposite ends of individual ones of said cross branches are wound toroidally about a common toroidal core of magnetic saturation inhibiting material for reduction in size of the filter, the saturation inhibiting core material comprising amorphous metallic substances arranged in encircling strata of said core for allowing reduction in size of a cross-sectional dimension of the core to approximately the cross-sectional dimension of one of said capacitors;

wherein the inductor in the first leg and the inductors in the second leg are operative to carry a ring current without undergoing a saturation of a core;

in each of the filters, there is an inductor of said first plurality of inductors which is positioned in said balanced line symmetricaly to an inductor of said second plurality of inductors, symmetrically positioned ones of said inductors sharing a common one of said toroidal cores;

wherein the inductors and the capacitors are mounted on one side of the substrate with axes of toroids of the inductors being parallel, and the toroidally wound inductors and the capacitors are arranged in a single row to obtain a compact configuration of the filter; and the plurality of filters are mounted in successive rows on the substrate.

* * * * *